(12) United States Patent
Kottapalli et al.

(10) Patent No.: US 10,868,736 B2
(45) Date of Patent: Dec. 15, 2020

(54) PROVISIONING/DEPROVISIONING PHYSICAL HOSTS BASED ON A DYNAMICALLY CREATED MANIFEST FILE FOR CLUSTERS IN A HYPERCONVERGED INFRASTRUCTURE

(71) Applicant: VMWARE, INC., Palo Alto, CA (US)

(72) Inventors: Ravi Kumar Reddy Kottapalli, Bangalore (IN); Srinivas Sampatkumar Hemige, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/372,424

(22) Filed: Apr. 2, 2019

(65) Prior Publication Data
US 2020/0236010 A1    Jul. 23, 2020

(30) Foreign Application Priority Data
Jan. 22, 2019 (IN) .............................. 201941002591

(51) Int. Cl.
*H04L 12/24* (2006.01)

(52) U.S. Cl.
CPC ...... *H04L 41/5054* (2013.01); *H04L 41/0893* (2013.01); *H04L 41/5022* (2013.01)

(58) Field of Classification Search
CPC ............. H04L 41/5054; H04L 41/0893; H04L 41/5022
See application file for complete search history.

(56) References Cited

U.S. PATENT DOCUMENTS

| | | | |
|---|---|---|---|
| 9,935,830 B1* | 4/2018 | Mahapatra .......... | H04L 41/0816 |
| 2006/0015773 A1* | 1/2006 | Singh .................. | G06F 11/2028 714/13 |
| 2017/0031622 A1* | 2/2017 | Nagarajan ............. | G06F 3/0631 |
| 2017/0257424 A1* | 9/2017 | Neogi ..................... | H04L 43/16 |

* cited by examiner

*Primary Examiner* — Viet D Vu

(57) ABSTRACT

Techniques for provisioning/deprovisioning physical hosts based on a dynamically created manifest file for clusters in hyperconverged infrastructures are disclosed. In one embodiment, a manifest file is dynamically generated for each cluster in an hyperconverged infrastructure. One or more threshold limits are defined for each cluster in the hyperconverged infrastructure. A W2H mapping table is created by mapping each cluster to respective physical hosts and the define one or more threshold limits. One or more physical hosts in a host pool is then identified, reserved, and prepared for provisioning one or more physical hosts in a host pool to a cluster upon a resource utilization of the cluster reaching the one or more threshold limits based on the dynamically generated manifest file. The prepared one or more physical hosts are then provisioned to the cluster in the hyperconverged infrastructure.

22 Claims, 4 Drawing Sheets

| W2H MAPPING TABLE 110 | | | | | |
|---|---|---|---|---|---|
| CLUSTER ID | PHYSICAL HOST IDS | FIRST THRESHOLD LIMIT | SECOND THRESHOLD LIMIT | MANIFEST FILE ID | CLUSTER PRIOTITY |
| 1 | XX | 60 | 70 | Y | 1 |
| | | | | | |

↙ 200

PROVISIONING/DEPROVISIONING PHYSICAL HOSTS BASED ON A DYNAMICALLY CREATED MANIFEST FILE FOR CLUSTERS IN A HYPERCONVERGED INFRASTRUCTURE

RELATED APPLICATIONS

Benefit is claimed under 35 U.S.C. 119(a)-(d) to Foreign Application Serial No. 201941002591 filed in India entitled "PROVISIONING/DEPROVISIONING PHYSICAL HOSTS ASED ON A DYNAMICALLY CREATED MANIFEST FILE FOR CLUSTERS IN A HYPERCONVERGED INFRASTRUCTURE", on Jan. 22, 2019, by VMWARE, Inc., which is herein incorporated in its entirety by reference for all purposes.

TECHNICAL FIELD

The present disclosure relates to hyperconverged infrastructure environments, and more particularly to methods, techniques, and systems for provisioning and/or deprovisioning physical hosts based on a dynamically created manifest file for clusters in hyperconverged infrastructure environments.

BACKGROUND

A hyperconverged infrastructure is a rack-based system that combines compute, storage and networking components into a single system to reduce data center complexity and increase scalability. Multiple nodes can be clustered together to create clusters and/or workload domains of shared compute and storage resources, designed for convenient consumption. However, existing hyperconverged infrastructures require manual provisioning of physical hosts in a host pool to the clusters based on cluster type and/or workload requirements in the hyperconverged infrastructure. Oftentimes, a user, such as an IT administrator may be required to provision physical hosts manually based on a cluster type and/or workload priority requirement and this can be a very time-consuming process. Further, the user may have to manually check resource utilization of each cluster and then manually provision and/or deprovision the physical hosts in the host pool to the clusters.

Figure 1:
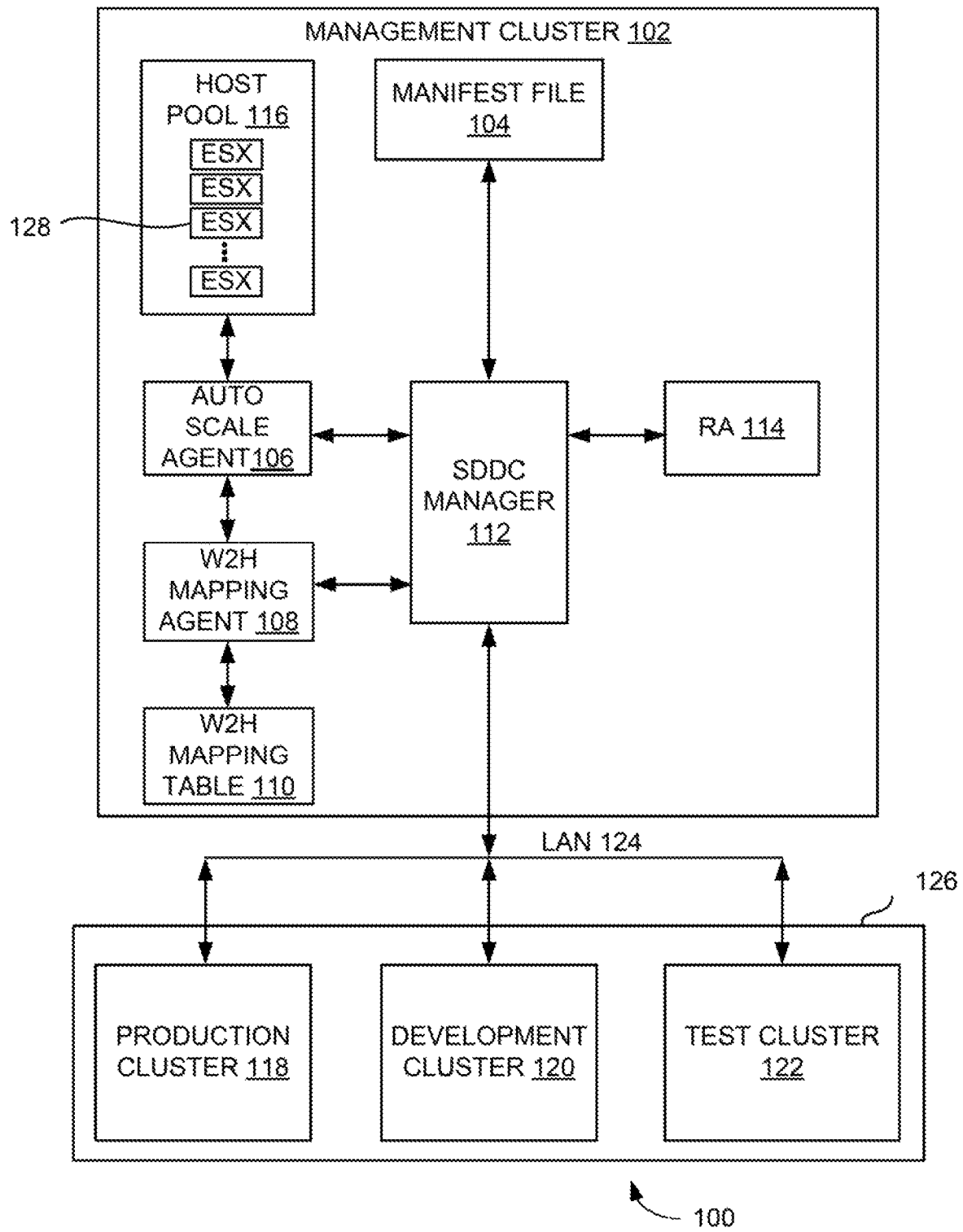
FIG. 1 depicts a block diagram of a computing system in which one or more embodiments of the present invention may be implemented.

The drawings described herein are for illustration purposes only and are not intended to limit the scope of the present subject matter in any way.

DETAILED DESCRIPTION

Embodiments described herein may provide an enhanced computer-based and network-based method, technique, and system for provisioning/deprovisioning physical hosts based on a dynamically created manifest file for clusters in a hyperconverged infrastructure. A cluster is a collection of resources (such as nodes, disks, adapters, databases, etc.) that collectively provide scalable services to end users and to their applications while maintaining a consistent, uniform, and single system view of the cluster services. Example cluster may be a stretched cluster, a multi-AZ cluster, a metro cluster, or a high availability (HA) cluster that crosses multiple areas within a local area network (LAN), a wide area network (WAN) or the like.

By design, a cluster is supposed to provide a single point of control for cluster administrators and at the same time the cluster is supposed to facilitate addition, removal, or replacement of individual resources without significantly affecting the services provided by the entire system. On one side, a cluster has a set of distributed, heterogeneous physical resources and, on the other side, the cluster projects a seamless set of services that are supposed to have a look and feel (in terms of scheduling, fault tolerance, etc.) of services provided by a single large virtual resource. However, existing hyperconverged infrastructures require manual provisioning of physical hosts in a host pool to the clusters based on cluster type and/or workload requirements in the hyperconverged infrastructure. Oftentimes, a user, such as an IT administrator may be required to provision physical hosts manually based on a cluster type and/or workload priority requirement and this can be a very time-consuming process. Further, the user may have to manually check resource utilization of each cluster and then manually provision the physical hosts in the host pool to the clusters. Furthermore, existing hyperconverged infrastructures do not have any mechanism to dynamically reserve and/or designate physical hosts in the host pool to the clusters for use based on resource utilization in the clusters and a manifest file.

In public and private clouds there can be several thousand physical hosts in one cluster and the physical hosts, in such a scenario, may need to be provisioned and/or deprovisioned from host pools to reduce downtime. Doing such configuration, allocation and provisioning manually can be very tedious, impractical and unreliable. Any mistake in configuration, allocation, provisioning, and/or deprovisioning of the physical hosts to the clusters can seriously impact the datacentre and/or public/private cloud operation and may significantly increase down-time. Further, manual provisioning and deprovisioning may not easily scalable and suitable for dynamic applications demand in an hyperconverged infrastructure. Furthermore, any delay in provisioning for capacity addition requirements may impact the performance of the applications. In addition, if a physical host provisioning fails, there can be significant delay in provisioning of another physical host in a cluster and this can further affect the performance of the applications.

System Overview and Examples of Operation

FIG. 1 is a system view of an example block diagram of a hyperconverged infrastructure 100 illustrating a management cluster 102 and one or more clusters 126 (for example, a production cluster 118, a development cluster 120, and a test cluster 122). Example cluster may be a stretched cluster, a multi-AZ cluster, a metro cluster, or a high availability (HA) cluster that crosses multiple areas within local area networks (LAN) 124. It can be envisioned that the cluster may also cross multiple areas via a wide area network (WAN). As shown in FIG. 1, management cluster 102 may include a manifest file 104, an auto scale agent 106, a workload-to-physical host (W2H) mapping agent 108, a W2H mapping table 110, a software-defined data center (SDDC) manager 112, a resource aggregator (RA) 114, and a host pool 116 that are communicatively connected to one or more clusters 126 via LAN 124. Further as shown in FIG. 1, host pool 116 may include one or more physical hosts 128. Example physical hosts 128 may include, but not limited to, physical computing devices, virtual machines, containers, or the like.

In operation, management cluster 102 dynamically generates manifest file 104 for each cluster 118, 120 and 122 in hyperconverged infrastructure 100. Manifest file 104 includes metadata associated with each cluster 118, 120 and 122. Manifest file may represent characteristics of clusters 118, 120 and 122. For example, it may be a blue print of clusters 118, 120 and 122. Metadata may include physical host hardware and software characteristics. Example host hardware and software characteristics are model type, storage type, central processing unit (CPU) type, network interface card (NIC) type, service level agreement (SLA) type, an image type of physical hosts and any associated patches and the like. Example storage type are model number, storage and model type, drive type, revolutions per minute (RPM), and capacity. Example SLA type are gold, silver and bronze. Example NIC type are number of NICs, speed and the like. In some embodiments, SDDC manager 112 dynamically generates manifest file 104 as and when clusters are created, updated and operational. In these embodiments, SDDC manager 112 automatically maintains and updates the manifest file 104 upon any changes made to clusters 118, 120 and 122. SDDC manager 112 dynamically maintains manifest file 104 based on any inclusions, deletions or changes made to policies associated with clusters 118, 120, and 122 by a user. SDDC manager 112 dynamically maintains manifest file 104. In one example, SDDC manager 112 dynamically updates associated manifest file for any changes made to a cluster by a user. It can be envisioned that once a manifest file is created for a cluster, another manifest file for a similar cluster can be quickly created by duplicating the already created manifest file for the cluster. With this approach, new clusters can be quickly added to the hyperconverged infrastructure using the existing manifest file. It can also be envisioned that manifest file may be updated for any additions or deletions of physical hosts to an existing cluster to facilitate expansion and contraction of the cluster capacity.

Figures 2, 3:
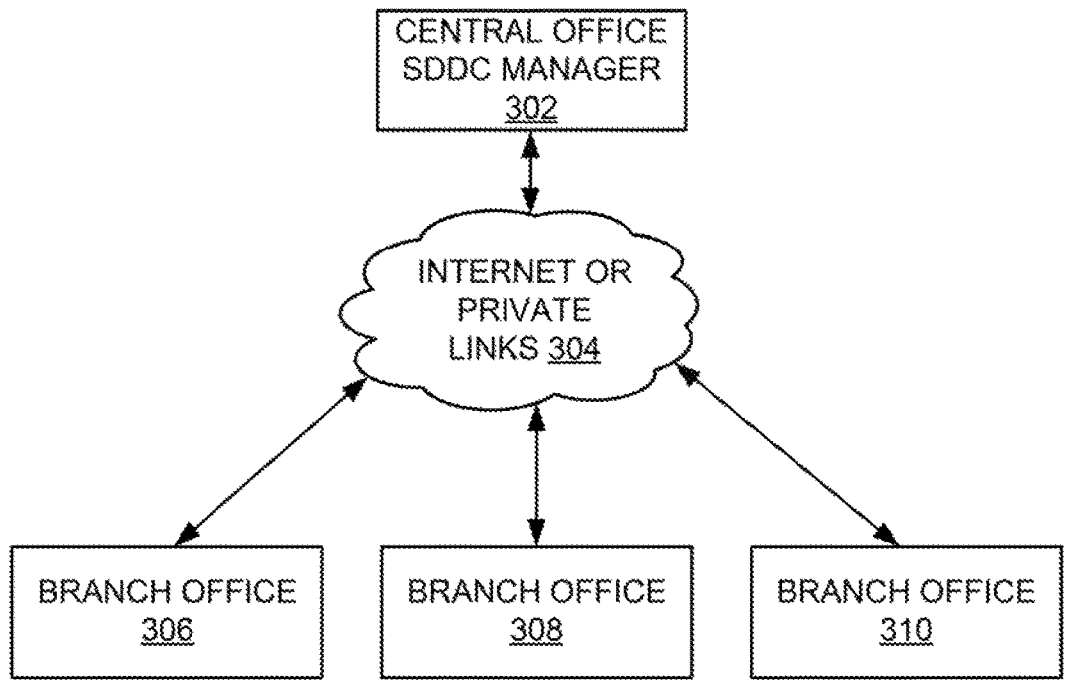
FIG. 2 depicts an example workload-to-physical host (W2H) mapping table created by a W2H mapping agent, such as those shown in FIG. 1.
FIG. 3 depicts another example block diagram of a computing system in which one ore more embodiments of the present invention may be implemented.

A user may then define one or more threshold limits for each cluster 118, 120, and 122 in the hyperconverged infrastructure 100. In one example, a user may define the first threshold limit and a second threshold limit for each cluster 118, 120 and 122 in the hyperconverged infrastructure 100 based on resource utilization. Example user is an information technology (IT) administrator. Example first threshold limit may be in the range of 60% to 70% and example second threshold limit may be in the range of 80% to 90%. In some examples, the first threshold limit and the second threshold limit for each cluster in the hyperconverged infrastructure 100 may be defined based on artificial intelligence (AI) and machine learning. In some other examples, a user may define the first threshold limit based on cluster priority and/or historical data. One can envision that each cluster 118, 120 and 122 may have a different first threshold limit and the second threshold limit. The first threshold limit and the second threshold limit may define any actions SDDC manager 112 may take to identify, reserve and provision/deprovision physical hosts 128 to one or more clusters 126. As soon as a user defines the first threshold limit and the second threshold limit to each cluster in the one or more clusters 126, SDDC manager 112 communicates this defined information to W2H mapping agent 108 to create or update W2H mapping table 110. W2H mapping agent 108 may create an entry for each cluster and its associated first threshold limit and second threshold limit along with associated physical host ids in the W2H mapping table 200 as shown in FIG. 2. For example, if a cluster 118, 120 and/or 122 has a higher priority (for example priority "gold" may refer to guaranteed resource addition on-demand and priority "silver" may refer to resource addition guaranteed within a predetermined time (example 48 hours)), then a user may choose the first threshold limit of about 60%. It can be envisioned that the first threshold limit and the second threshold limit may be set automatically based on artificial intelligence (AI) and machine learning techniques.

Management cluster 102 may then create a W2H mapping table 110 by mapping each cluster to respective physical hosts and defined one or more threshold limits, manifest file identifier (ID), and workload priority using the created manifest file. In some examples, management cluster 102 may then create a W2H mapping table 110 by mapping each cluster to respective physical hosts and defined first threshold limit and the second threshold limit, manifest file identifier (ID), and workload priority using the created manifest file. In some embodiments, SDDC manager 112 assigns cluster id to each cluster 118, 120, and 122, physical host id to each physical host in host pool 116 and manifest id to each manifest file associated with each cluster. In these embodiments, SDDC manager 112 then creates W2H mapping table 110 by mapping the assigned cluster id, physical host id, defined first threshold limit and the second threshold limit, manifest id and cluster priority. Cluster priority may be obtained from the SLA type information. An example W2H mapping table 200 created by SDDC manager 112 is shown in FIG. 2. In some embodiments, W2H mapping agent 108 creates and maintains the W2H mapping table 200 (FIG. 2). In these embodiments, W2H mapping agent 108 provides physical host(s) reserved per cluster and maintains a list of reserved physical hosts associated with each cluster 118, 120, and 122.

Further in operation, management cluster 102 may identify, reserve, and prepare one or more physical hosts 128 in host pool 116 to a cluster 118, 120 and 122 upon a resource utilization of the cluster reaching one or more threshold limits based on associated dynamically generated manifest file. In some examples, management cluster 102 may identify and reserve one or more physical hosts 128 in host pool 116 to a cluster 118, 120 and 122 upon a resource utilization of the cluster reaching the first threshold limit based on associated dynamically generated manifest file. Furthermore, in operation, management cluster updates the identified and reserved one or more physical hosts as reserved in the created W2H mapping table 110. In some embodiments, SDDC manager 112 may identify and reserve one or more physical hosts 128 in host pool 116 to a cluster 118, 120 and 122 upon a resource utilization of the cluster reaching the first threshold limit based on associated dynamically generated manifest file. The term "resource utilization" refers to a central processing unit (CPU), memory and/or storage consumption/utilization. Also, the term "resource utilization may refer to consumption/utilization at a system level, a site level, a rack level, a cluster and/or a physical host level. Further in these embodiments, SSDC manager 112 may periodically obtain resource utilization data from RA 114 at a cluster level for each cluster 118, 120, and 122. Furthermore, in these embodiments, the identified and reserved one or more physical hosts 128 in host pool 116 that are not assigned to any of the one or more clusters 126 in hyperconverged infrastructure 100 may be made available to other non-assigned clusters. SDDC manager 112 may identify one or more physical hosts 128 based on network, storage, and hardware requirements and physical host resource capacity. Once SDDC manager 112 identifies and reserves one or more physical hosts to a cluster in the one or more clusters 126, the identified and reserved one or more physical hosts may not be assigned to any other clusters in the one or more clusters 126 in hyperconverged infrastructure 100.

Further in operation, management cluster 102 prepares the identified and reserved one or more physical hosts 128 in the host pool 116 for provisioning upon the resource utilization of the cluster reaching the second threshold limit using the associated generated manifest file. In some embodiments, SDDC manager 112 prepares the identified and reserved one or more physical hosts 128 in the host pool 116 for provisioning upon the resource utilization of the cluster reaching the second threshold limit. In these embodiments, SDDC manager 112 may prepare the identified and reserved one or more physical hosts 128 in host pool 116 based on imaging, networking, domain name system (DNS), network time protocol (NTP), physical network interface card (NIC) requirements and affinity rules of the cluster upon the resource utilization of the cluster reaching the second threshold limit. SDDC manager 112 may image the identified and reserved one or more physical hosts 128 based on an associated cluster in the hyperconverged infrastructure 100. Further, SDDC manager 112 may pre-configure the identified and reserved one or more physical hosts 128 based on the imaging, networking, domain name system (DNS), network time protocol (NTP) and physical network interface card (NIC) requirements of the cluster upon resource utilization of the cluster reaching the second threshold limit. Preparing the identified and reserved one or more physical hosts 128 may be an advance preparation activity before dynamically provisioning identified and reserved one or more physical hosts 128 to the cluster. Preparation may also include image and path installation based on the cluster.

Furthermore, in operation, management cluster 102 may provision the prepared one or more physical hosts 128 to the assigned cluster in the hyperconverged infrastructure 100. In some embodiments, auto scale agent 106 may provision the prepared one or more physical hosts 128 to the assigned cluster in the hyperconverged infrastructure 100.

Also, during operation, SDDC manager 112 may deprovision one or more physical hosts from a cluster upon the resource utilization of the cluster falling below the second threshold limit. Further SDDC manager 112 may place the deprovisioned one or more physical hosts back in host pool 116 upon the resource utilization falling below or equal to the first threshold limit. Furthermore, SDDC manager 112 may update and/or remove configurations associated with these deprovisioned one or more physical hosts in the associated manifest file. SDDC manager 112 may also place the one or more physical hosts in host pool 116 when the resource utilization falls below or equal to second threshold limit so that any eligible cluster in one or more clusters 126, based on above recited criteria, may use the placed one or more physical hosts for capacity addition.

FIG. 3 is a system view of another example block diagram of a mobile robot fleet management system 300 illustrating a central office SDDC manager 302 and branch offices 306, 308 and 310 that are communicatively coupled via Internet, public or private communication links 304. During operation, central office SDDC manager 302 may act as a management station and control and coordinate functions of clusters and/or workloads at branch office locations 306, 308 and 310. In these embodiments, central office SDDC manager 302 may maintain a separate W2H mapping table 108 for associated with each branch office location. The communications between the central office SDDC manager 302 and branch offices 306, 308, and 310 maybe communicated via private, public and/or dedicated communication links, such as shown in FIG. 3. Further in these embodiments, physical hosts may be prepared using locally stored images at the branch office locations.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 4:
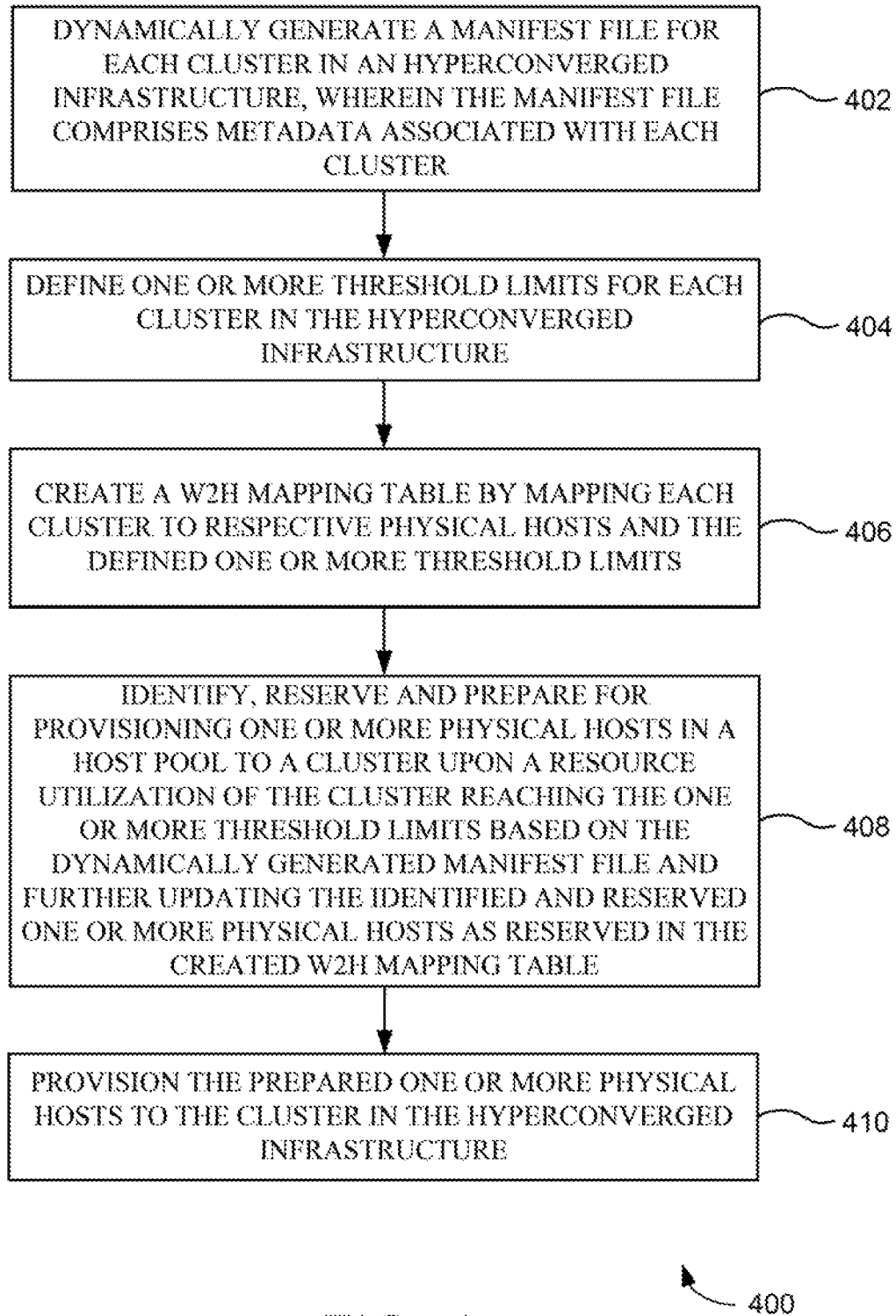
FIG. 4 depicts a flow diagram of a method of provisioning/deprovisioning physical hosts based on a dynamically created manifest file for clusters in a hyperconverged infrastructure, according to an embodiment.

FIG. 4 is an example flow diagram 400 illustrating provisioning/deprovisioning physical hosts based on a dynamically created manifest file for clusters in a hyperconverged infrastructure. The process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, a manifest file is dynamically generated for each cluster in an hyperconverged infrastructure. The manifest file includes metadata associated with each cluster. At 404, one or more threshold limits are defined for each cluster in the hyperconverged infrastructure. At 406, a workload-to-physical host (W2H) mapping table is created by mapping each cluster to respective physical hosts and the defined one or more threshold limits. At 408, one or more physical hosts in a host pool is identified, reserved and prepared for provisioning upon a cluster reaching the one or more threshold limits based on the dynamically generated manifest file. Further, the identified and reserved one or more physical hosts are updated as reserved in the created W2H mapping table. At 410, the prepared one or more physical hosts are provisioned to the cluster in the hyperconverged infrastructure.

Figure 5:
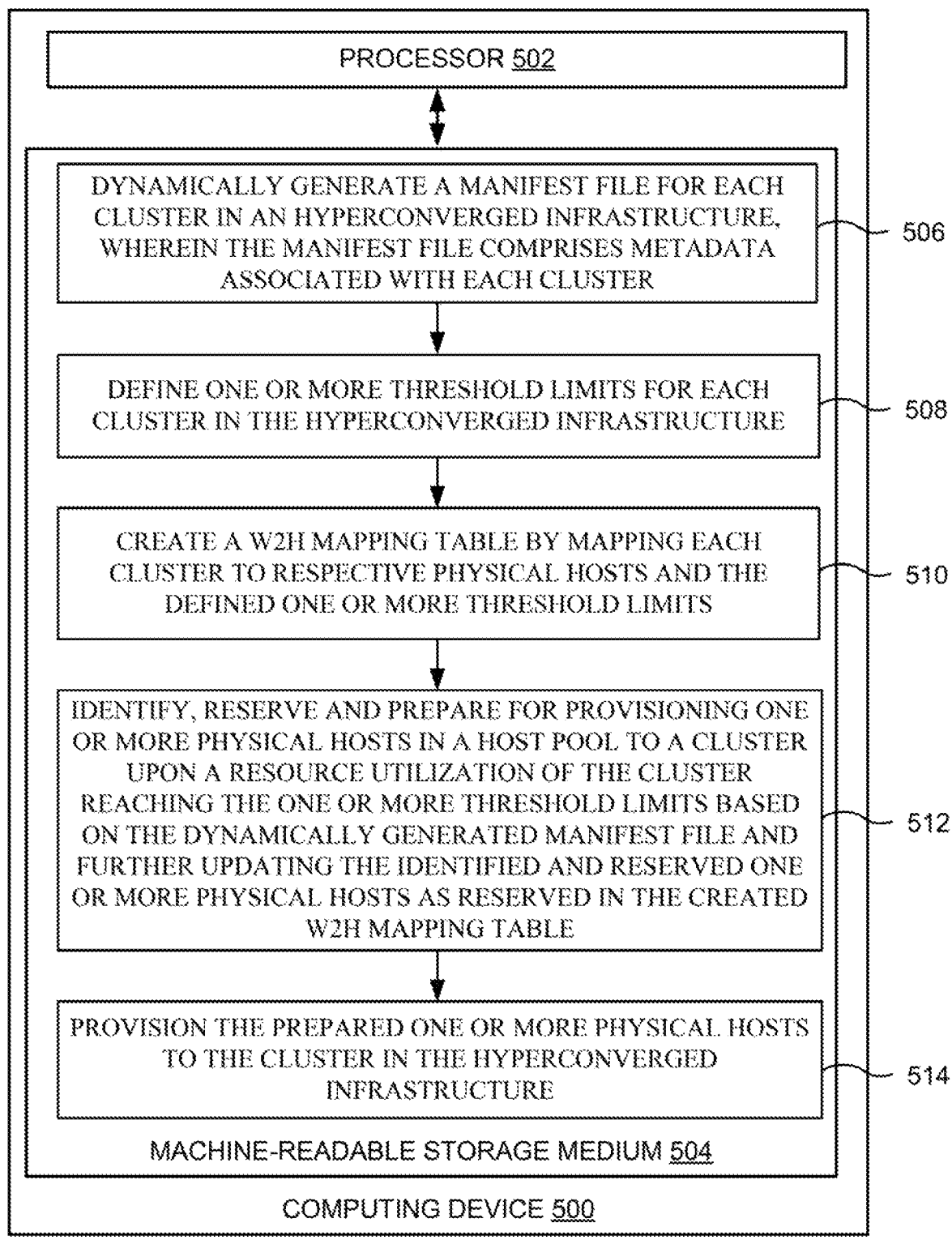
FIG. 5 is a block diagram of an example computing system including a non-transitory computer-readable storage medium, storing instructions to provision/deprovision physical hosts based on a dynamically created manifest file for clusters in a hyperconverged infrastructure.

FIG. 5 is a block diagram of an example computing device 500 including non-transitory computer-readable storage medium, storing instructions for dynamically dynamically provisioning/deprovisioning physical hosts based on a dynamically created manifest file for clusters in a hyperconverged infrastructure. The computing device 500 may include a processor 502 and a machine-readable storage medium 504 communicatively coupled through a system bus. The processor 502 may be any type of central processing unit (CPU), microprocessor, or processing logic that interprets and executes machine-readable instructions stored in the machine-readable storage medium 504. The machine-readable storage medium 504 may be a random-access memory (RAM) or another type of dynamic storage device that may store information and machine-readable instructions that may be executed by the processor 502. For example, the machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 504 may be a non-transitory machine-readable medium. In an example, the machine-readable storage medium 504 may be remote but accessible to computing device 500.

The machine-readable storage medium 504 may store instructions 506-514. In an example, instructions 506-514 may be executed by processor 502 for dynamically provisioning/deprovisioning physical hosts based on a dynamically created manifest file for clusters in a hyperconverged infrastructure. Instructions 506 may be executed by processor 502 to dynamically generate a manifest file for each cluster in an hyperconverged infrastructure. The manifest file comprises metadata associated with each cluster. Instructions 508 may be executed by processor 502 to define one or more threshold limits for each cluster in the hyperconverged infrastructure. Instructions 510 may be executed by processor 502 to create a workload-to-physical host (W2H) mapping table by mapping each cluster to respective physical hosts and the defined one or more threshold limits. Further, instructions 512 may be executed by processor 502 to identify, reserve, and prepare one or more physical hosts in a host pool to a cluster upon a resource utilization of the cluster reaching the one or more threshold limits based on the dynamically generated manifest file. In addition, instructions 514 may be executed by processor 502 to provision the prepared one or more physical hosts to the cluster in the hyperconverged infrastructure.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
dynamically generating a manifest file for each cluster in a hyperconverged infrastructure, wherein the manifest file comprises metadata associated with each cluster;
defining a first threshold limit and a second threshold limit for each cluster in the hyperconverged infrastructure;
creating a workload-to-physical host (W2H) mapping table by mapping each cluster to respective physical hosts in a host pool and the defined first and second threshold limits;
based on the W2H mapping table and the dynamically generated manifest file,
identifying and reserving one or more physical hosts in the host pool to a cluster upon a resource utilization of the cluster reaching the first threshold limit; and
preparing the identified and reserved one or more physical hosts in the host pool for provisioning upon the resource utilization of the cluster reaching the second threshold limit and further updating the identified and reserved one or more physical hosts as reserved in the created W2H mapping table; and
provisioning the prepared one or more physical hosts to the cluster in the hyperconverged infrastructure.

2. The method of claim 1, wherein the metadata comprises cluster characteristics, and wherein the cluster characteristics are a computer type, a storage type, a network type, an image type of physical hosts and any associated patches, and/or a service level agreement (SLA) type.

3. The method of claim 1, further comprising:
periodically obtaining resource utilization data at a cluster level for each cluster.

4. The method of claim 1, wherein creating the W2H mapping table further comprises:

creating the W2H mapping table by further mapping the clusters to priority data present in respective SLA compliances.

5. The method of claim 4, further comprising:
dynamically maintaining the W2H mapping table upon any changes to each cluster, the host pool and the SLA compliances.

6. The method of claim 1, further comprising:
deprovisioning the one or more physical hosts in the cluster upon the resource utilization of the cluster falling below the second threshold limit; and
placing the deprovisioned one or more physical hosts in the host pool upon the resource utilization falling below the first threshold limit.

7. The method of claim 1, wherein identifying and reserving the one or more physical hosts in the host pool to the cluster comprises:
identifying and reserving the one or more physical hosts in the host pool to the cluster based on associated priority data in the W2H mapping table upon the resource utilization of the cluster reaching the first threshold limit.

8. The method of claim 1, wherein defining the first threshold limit and the second threshold limit for each cluster comprises:
defining the first threshold limit and the second threshold limit for each cluster in the hyperconverged infrastructure by a user; or
defining the first threshold limit and the second threshold limit for each cluster in the hyperconverged infrastructure based on artificial intelligence and machine learning techniques.

9. The method of claim 1, wherein preparing the identified and reserved one or more physical hosts in the host pool fir provisioning upon the resource utilization of the cluster reaching the second threshold limit comprises:
preparing the one or more physical hosts in the host pool based on imaging, networking, domain name system (DNS), network time protocol (NTP), physical network interface card (NIC) requirements, and affinity rules of the cluster upon the resource utilization of the cluster reaching the second threshold limit, and wherein imaging the one or more physical hosts comprises imaging the one or more physical hosts based on an associated cluster in the hyperconverged infrastructure; and
pre-configuring the one or more physical hosts based on the imaging, networking, domain name system (DNS), network time protocol (NTP) and physical network interface card (NIC) requirements of the cluster upon the resource utilization of the cluster reaching the second threshold limit.

10. A system comprising:
a management cluster, wherein the management cluster comprises a host pool and wherein the host pool comprises one or more physical hosts; and
one or more clusters communicatively coupled to the management cluster via a LAN and the management cluster is to:
dynamically generate a manifest file for each cluster in a hyperconverged infrastructure, wherein the manifest file comprises metadata associated with each cluster;
define a first threshold limit and a second threshold limit for each cluster in the hyperconverged infrastructure by a user;
create a workload-to-physical host workload-to-physical host (W2H) mapping table by mapping each duster to respective physical hosts in the host pool and the defined first and second threshold limits;
based on the W2H mapping table and the dynamically generated manifest file,
identify and reserve one or more physical hosts in the host pool to a duster upon a resource utilization of the cluster reaching the first threshold limit; and
prepare the identified and reserved one or more physical hosts in the host pool for provisioning upon the resource utilization of the cluster reaching the second threshold limit and further updating the identified and reserved one or more physical hosts as reserved in the created W2H mapping table; and
provision the prepared one or more physical hosts to the cluster in the hyperconverged infrastructure.

11. The system of claim 10, wherein the metadata comprises cluster characteristics, and wherein the cluster characteristics are a computer type, a storage type, a network type, an image type of physical hosts and any associated patches, and/or a service level agreement (SLA) type.

12. The system of claim 10, wherein the management cluster to:
periodically obtain resource utilization data at a cluster level for each cluster.

13. The system of claim 10, wherein creating the W2H mapping table further comprises:
creating the W2H mapping table by farther mapping the clusters to priority data present in respective SLA compliances.

14. The system of claim 10, wherein the management cluster to:
dynamically maintain the W2H mapping table upon any changes to each cluster, the host pool and the SLA compliances.

15. The system of claim 10, wherein the management cluster to:
deprovision the one or more physical hosts in the cluster upon the resource utilization of the cluster falling below the second threshold limit; and
place the deprovisioned one or more physical hosts in the host pool upon the resource utilization filling, below the first threshold limit.

16. The system of claim 10, wherein the management cluster to:
identify and reserve the one or more physical hosts in the host pool to the cluster based on associated priority data in the W2H mapping table upon the resource utilization of the cluster reaching the first threshold limit.

17. The system of claim 10, wherein the management cluster to:
define the first threshold limit and the second threshold limit for each cluster in the hyperconverged infrastructure based on artificial intelligence and machine learning techniques.

18. The system of claim 10, wherein the management cluster to:
prepare the one or more physical hosts in the host pool based on imaging, networking, domain name system (DNS), network time protocol (NTP), physical network interface card (NIC) requirements, and affinity rules of the cluster upon the resource utilization of the cluster reaching the second threshold limit, and wherein imaging the one or more physical hosts comprises imaging the one or more physical hosts based on an associated cluster in the hyperconverged infrastructure; and pre-configure the one or more physical hosts based on the imaging, networking, domain name system (DNS), network time protocol (NTP) and physical network interface card (NIC) requirements of the cluster upon the resource utilization of the cluster reaching the second threshold limit.

19. A non-transitory machine-readable storage medium encoded with instructions that, when executed by a processor cause the processor to:
dynamically generate a manifest file for each cluster in a hyperconverged infrastructure, wherein the manifest file comprises metadata associated with each cluster;
define a first threshold limit and a second threshold limit for each cluster in the hyperconverged infrastructure by a user;
create a workload-to-physical host (W2H) mapping table by mapping each cluster to respective physical hosts in a host pool and the defined first and second threshold limits;
based on the W2H mapping, table and the dynamically generated manifest file,
identify and reserve one or more physical hosts in the host pool to a cluster upon a resource utilization of the cluster reaching the first threshold limit; and
prepare the identified and reserved one or more physical hosts in the host pool for provisioning upon the resource utilization of the cluster reaching the second threshold limit and further updating the identified and reserved one or more physical hosts as reserved in the created W2H mapping table; and
provision the prepared one or more physical hosts to the cluster in the hyperconverged infrastructure.

20. The non-transitory machine-readable storage medium of claim 19, further comprising instructions to:
periodically obtain resource utilization data at a cluster level for each cluster.

21. The non-transitory machine-readable storage medium of claim 19, further comprising instructions to:
deprovision the one or more physical hosts in the cluster upon the resource utilization of the cluster falling below the second threshold limit; and
place the deprovisioned one or more physical hosts in the host pool upon the resource utilization falling below the first threshold limit.

22. The non-transitory machine-readable storage medium of claim 19, further comprising instructions to:
identify and reserve the one or more physical hosts in the host pool to the cluster based on associated priority data in the W2H mapping table upon the resource utilization of the cluster reaching the first threshold limit.

* * * * *